(12) United States Patent
Buyuktosunoglu et al.

(10) Patent No.: US 7,698,249 B2
(45) Date of Patent: Apr. 13, 2010

(54) SYSTEM AND METHOD FOR PREDICTING HARDWARE AND/OR SOFTWARE METRICS IN A COMPUTER SYSTEM USING MODELS

(75) Inventors: Alper Buyuktosunoglu, White Plains, NY (US); Ruhi Sarikaya, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 11/625,392

(22) Filed: Jan. 22, 2007

(65) Prior Publication Data

US 2008/0177686 A1    Jul. 24, 2008

(51) Int. Cl.
*G06F 17/00* (2006.01)
*G06F 19/00* (2006.01)

(52) U.S. Cl. .............................. 706/58; 706/21; 706/16
(58) Field of Classification Search .................. None
See application file for complete search history.

(56) References Cited

U.S. PATENT DOCUMENTS 6,941,287 B1 * 9/2005 Vaidyanathan et al. ........ 706/12
2006/0074830 A1 * 4/2006 Mojsilovic ................... 706/45

OTHER PUBLICATIONS

Isci et al., C., "Long-Term Workload Phases: Duration Predictions and Applications to DVFS", 2005.*

Anoop Iyer et al., "Power Aware Microarchitecture Resource Scaling"; citeseer.ist.psu.edu/iyer01power.html—24k, 2001.
Ashutosh S. Dhodapkar et al., "Managing Multi-Configurable Hardware via Dynamic Working Set Analysis"; 2. citeseer.ist psu edu/dhodapkar02managing html—26k, 2002.
David H. Albonesi et al., "Dynamically Tuning Processor Resources with Adaptive Processing"; 3. www.cs.rochester.edu/~maglis/ftp/albonesi_ieeecomputer03.pdf, 2003.
Canturk Isci et al., "Long-Term Workload Phases: Duration Predictions and Applications to DVFS"; 4. ieeexplore.ieee.org/xpls/abs_all.jsp?arnumber=1528455, 2005.
Christopher J. Hughes et al , "Saving Energy with Architectural and Frequency Adapations for Multimedia Applications"; 5. www cs.uiuc edu/~sadve/Publications/micro34-supplement ps, 2001.
Evelyn Duesterwald et al., "Characterizing and Predicting Program Behavior and its Variability"; 6. www.cs.rochester.edu/u/sandhya/papers/pact03.ps, 2003.

* cited by examiner

*Primary Examiner*—David R Vincent
*Assistant Examiner*—Adrian L Kennedy
(74) *Attorney, Agent, or Firm*—Ryan, Mason & Lewis, LLP (57) ABSTRACT

An objective function is dynamically chosen from a pool of available objective functions, and a prediction model is dynamically chosen from a pool of available prediction models. Points of inflection are determined for the chosen objective function, based on past values of a metric, to obtain a set of equations that can be solved to obtain model parameters associated with the chosen prediction model. The equations are solved to obtain the model parameters, and a future value of the metric is predicted based on (i) at least some of the past values of the metric and (ii) the chosen prediction model, with the obtained associated model parameters.

17 Claims, 4 Drawing Sheets

SYSTEM AND METHOD FOR PREDICTING HARDWARE AND/OR SOFTWARE METRICS IN A COMPUTER SYSTEM USING MODELS

FIELD OF THE INVENTION

The present invention generally relates to information technology, and, more particularly, to analysis and management of computer systems.

BACKGROUND OF THE INVENTION

Adaptive dynamic management of parameters such as power, performance, temperature and reliability is becoming an important issue for computer systems. Workload characteristics in a modern networking environment are very dynamic. In order to maximize performance, minimize power usage, and/or increase reliability, it is important to model dynamics in workload performance, as well as power and/or reliability metrics.

In recent years, application phase behavior has seen growing interest with two main goals. In the first category, researchers seek to identify program phases from simulation traces, or runtime power or performance behavior, in order to select representative points within a run to study or simulate. In the second category, the goal is to recognize phase shifts dynamically in running systems, in order to perform on-the-fly optimizations. These optimizations include a wide range of possible actions such as voltage/frequency scaling, thermal management, dynamic cache reorganizations, and dynamic compiler optimizations of particular code regions. The second category centers on use of past values to predict next values, but without any mechanism regarding how to use the past values in a principled and optimum way. In that respect, the techniques are ad-hoc and not applicable to different metrics of interest for a program running on a computer system; rather, these predictors are designed to work for a specific metric of interest, and may not generalize to unseen data. Even though there are a number of recent studies addressing this issue, the previously proposed methods are, as just noted, rather ad-hoc. As such they are not reliable predictors and their success has been limited.

It would thus be desirable to overcome the limitations in previous approaches.

SUMMARY OF THE INVENTION

Principles of the present invention provide techniques for predicting a metric associated with a computer system. In one aspect, an exemplary method includes the steps of dynamically choosing an objective function from a pool of available objective functions, dynamically choosing a prediction model from a pool of available prediction models, and locating points of inflection for (that is, maximizing or minimizing) the objective function chosen in the step of choosing the objective function, based on past values of the metric, to obtain a set of equations that can be solved to obtain model parameters associated with the prediction model chosen in the step of choosing the prediction model. The method further includes solving the equations to obtain the model parameters, and predicting a future value of the metric, based on (i) at least some of the past values of the metric and (ii) the prediction model chosen in the step of choosing the prediction model, with the associated model parameters determined in the solving step. The method can be computer-implemented.

One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

One or more embodiments of the invention may provide one or more beneficial technical effects, such as, for example, closely tracking actual data, effectively employing statistical and signal processing techniques in a new field, accurately modeling and predicting key metrics to allow the system to adapt and make efficient use of resources while optimizing the system performance, and the like.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
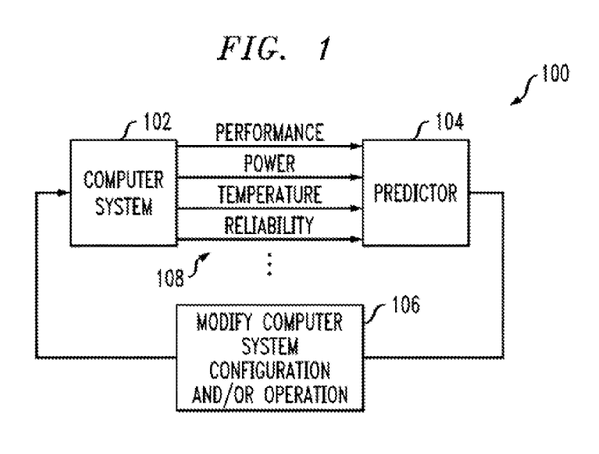
FIG. 1 is a block diagram, also functioning as a flow chart, showing overall operation of a system according to an aspect of the invention.

FIG. 1 shows a combined block diagram and flowchart 100 illustrating overall operation of a system 102 employing one or more inventive aspects. Relevant characterization metrics 108 are continuously observed through a computer system 102 and input into prediction subsystem 104. The predictor 104 makes use of an inventive prediction method to predict future values of a metric. Such prediction can be used, by way of example and not limitation, to optimize the efficiency of the computer system 102, in accordance with the particular efficiency metric of choice in the particular application, as shown by modifying step 106.

The metric can be indicative of one or more of workload, temperature, power, reliability and performance. Power can be instantaneous or average power consumption, or power can be integrated to obtain total energy consumed. The performance metric could include cache misses, execution time, or instructions per cycle. Reliability could include mean time between failures (MTBF), temperature of key component(s), and the like. These examples are not intended to be limiting, and the skilled artisan, given the teachings herein, will appreciate other metrics that can advantageously be predicted using inventive techniques.

Figure 2:
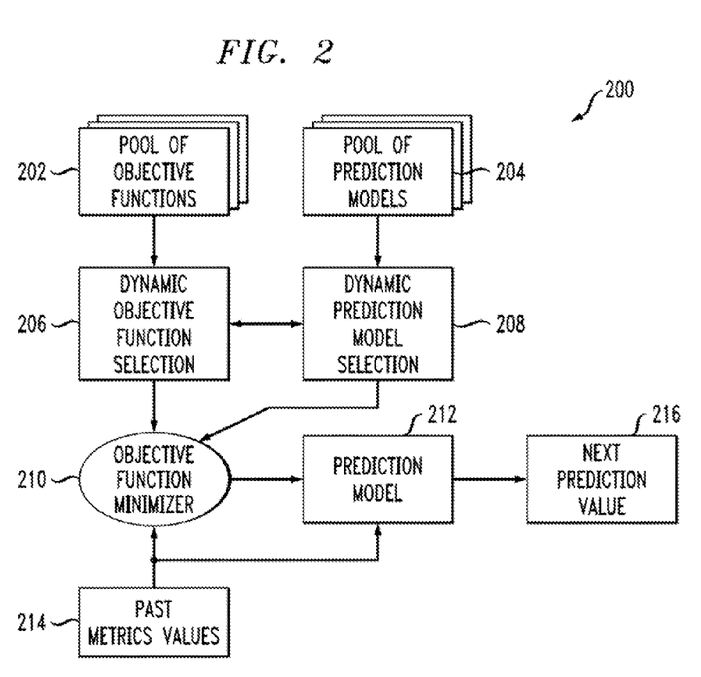
FIG. 2 is a flow chart of exemplary method steps according to an aspect of the invention.

Attention should now be given to FIG. 2, which shows flow chart 200 of exemplary steps in a method of predicting a metric associated with a computer system, according to an aspect of the invention. In block 206, an objective function is dynamically chosen from a pool 202 of available objective functions. In block 208, a prediction model is dynamically chosen from a pool 204 of available prediction models. In block 210, points of inflection are located for the objective function chosen in the step 206 of choosing the objective function, based on past values 214 of the metric, to obtain a set of equations that can be solved to obtain model parameters associated with the prediction model chosen in the step 208 of choosing the prediction model. It should be noted that one does not usually start predicting the next value right away, rather, one waits until, say, 50-100 samples have been observed and then starts the prediction process. This waiting time is generally negligible compared to the overall length of the data sequence. It will be appreciated that in the specific example of FIG. 2, block 210, the objective function is minimized, but the skilled artisan will appreciate that one can transform a minimization problem to a maximization problem or vice versa. Accordingly, the more genetic terminology of locating points of inflection is employed herein to encompass both minimizing and maximizing the objective function.

In step 212, the equations are solved to obtain the model parameters, thus yielding a prediction model which can be employed to obtain, as at block 216, a predicted future value of the metric, based on (i) at least some of the past values 214 of the metric and (ii) the prediction model chosen in the step 208 of choosing the prediction model, with the associated model parameters determined in the solving step 212. One can solve the equations in step 212 numerically and/or through analytical techniques. The future value can be predicted based on all or a subset of the past values.

Once a true (for example, measured) future value of the metric is obtained, the steps of choosing the objective function 206, choosing the prediction model 208, and locating the points of inflection for the objective function 210 can be repeated for a future time step, with the true future value of the metric just obtained included in the past values 214 of the metric.

By way of summary and provision of further detail, in block 206 we dynamically choose an objective function to minimize (or maximize), from the pool of objective functions 202. There are numerous possible objective functions, including minimum square error (MSE), minimum error, entropy, likelihood, minimum divergence, maximum margin, minimum classification error, minimum distortion, minimum variance, and the like, as well as user defined functions. In general, the objective function is a loss function (for example, a probability function, likelihood function, or error function, but not limited to these examples); it models or described operational requirements and is a function of past values and model parameters. Thus, the objective function is first chosen from a predefined set of objective functions, and during task execution a different objective function can be selected. This selection can include, for example, evaluating the performance of each of the predefined objective functions (using past values for a given model) on the past values, and if any of the objective functions outperforms the current one on the past values observed up to now, one can update the type of objective function. Thus, in general terms, the dynamic choosing of the objective function comprises the sub-steps of evaluating performance of each objective function in the pool 202 of objective functions, based on past values 214 of the metric, for a given one of the models 204, and if any of the objective functions in the pool outperforms a current one of the functions in the evaluating step, updating the chosen objective function to the function which outperforms the current function.

In block 208, we also dynamically choose a prediction model from the pool of prediction models 204 (note that filters are one specific case of models, and models including but not limited to filters are encompassed in the inventive scope). There are numerous prediction models, including linear and nonlinear filters. In one particular exemplary embodiment, the prediction model comprises linear prediction (LPC) and the model parameters comprise linear predictive filter coefficients. LPC is a non-limiting example, and other types of models can be employed, for example, nonlinear models, Markov models, decision trees, auto-regressive models, and the like. Further, there can be additional objective functions and prediction models that can be employed by one skilled in the art, given the benefit of the teachings herein.

The prediction model is first chosen from a predefined set 204 of prediction models. During task execution a different prediction model can be selected. This can include, for example, evaluating the performance of the predefined models for a given objective function, and if any of the prediction models outperforms the current one, we update the type of prediction model. Thus, in general terms, the dynamic choosing of the prediction model comprises the sub-steps of evaluating performance of each prediction model in the pool 204 of prediction models for a given one of the objective functions 202, and if any of the prediction models in the pool 204 outperforms a current one of the models in the evaluating step, updating the chosen prediction model to the model which outperforms the current model.

As pet block 210, once an objective function and prediction model are chosen, we minimize (or perform an equivalent maximization for) the objective function, using past values 214. Minimization can be performed by taking the (partial) derivative of the objective function, with respect to the model parameters, and setting it equal to zero. Minimizing (or maximizing) the objective function results in a set of equations that can be solved analytically or through numerical optimization. Thus, the equations can be solved to estimate the prediction filter coefficients (or other model parameters), obtaining prediction model 212. Using the prediction model and past values 214 we estimate the next value 216. We then observe the true value of the metric, and re-estimate the value of the objective function and/or prediction model. Note that as used herein "we" and similar words are intended to be inclusive of machine-performed functionality and not limited to actions per formed by human beings.

Still with reference to FIG. 2, and harking back also to block 106 of FIG. 1, it will be appreciated that an appropriate action can be taken based on the predicted future value 216 of the metric. The action could include modifying the computer system configuration and/or operation; by way of example and not limitation, this could include reallocating system resources associated with the computer system.

Figure 3:
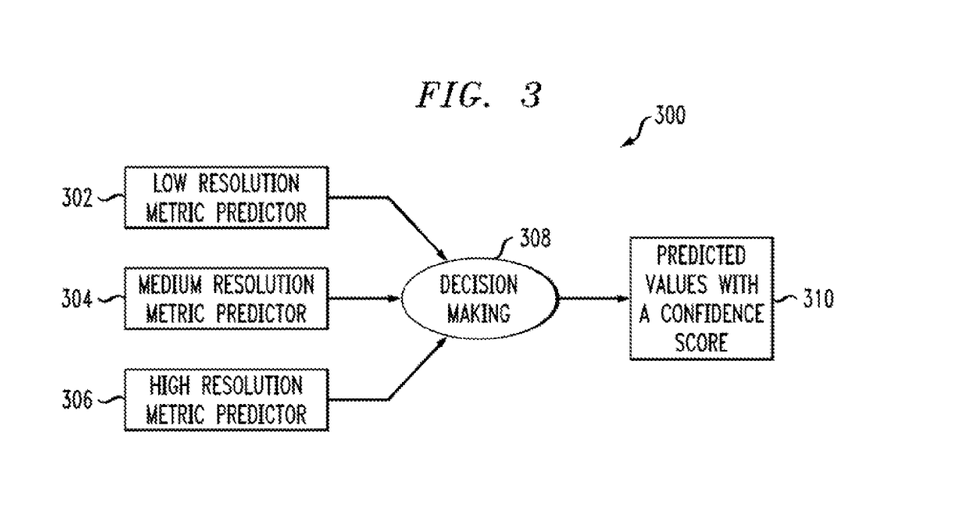
FIG. 3 is a flow chart of exemplary method steps according to another aspect of the invention.

Turning now to FIG. 3, which is a flow chart 300 of exemplary method steps according to another aspect of the invention, the steps described above can be optionally conducted for a first sampling rate for measuring the metric, in which case the process can be repeated for at least one additional sampling rate. By way of example and not limitation, the process could be repeated again, so as to obtain low, medium, and high resolution metric predictors 302, 304, and 306. The results from the first sampling rate and the additional sampling rate(s) can be combined, as shown at block 308, to generate a final predicted value (or value(s)) of the metric, with a confidence score, as at block 310. The combining of the results could be, for example, a weighted combination. In another aspect, the combining of the results could involve using results associated with a lower resolution sampling rate to bound results associated with a higher resolution sampling rate.

Thus, by way of summary and provision of further detail, if the data is sampled at different sampling rates (for example, 10 milliseconds-1 millisecond), running parallel predictions and combining their outputs allows us to estimate confidence scores for the predicted values. High resolution metric prediction performs detailed value prediction, whereas low resolution prediction addresses the long term evolution of the metric. Prediction can be at different resolution levels. For some applications predictions at small intervals are desirable, while for others predictions for longer intervals are needed. In FIG. 3, three resolution levels are presented: low, medium and high. The incoming data sequence can be sub-sampled according to the required resolution level, and prediction can be performed on the sub-sampled data sequence. Predictions from all three resolutions can be combined to assign a confidence value to the final prediction value. The skilled artisan will appreciate how to set sampling rates, given the teachings herein; for analog sources, there may be some flexibility in this regard; for digital sources, sampling may be constrained by the original digitization of the signal.

Example

Figure 4:
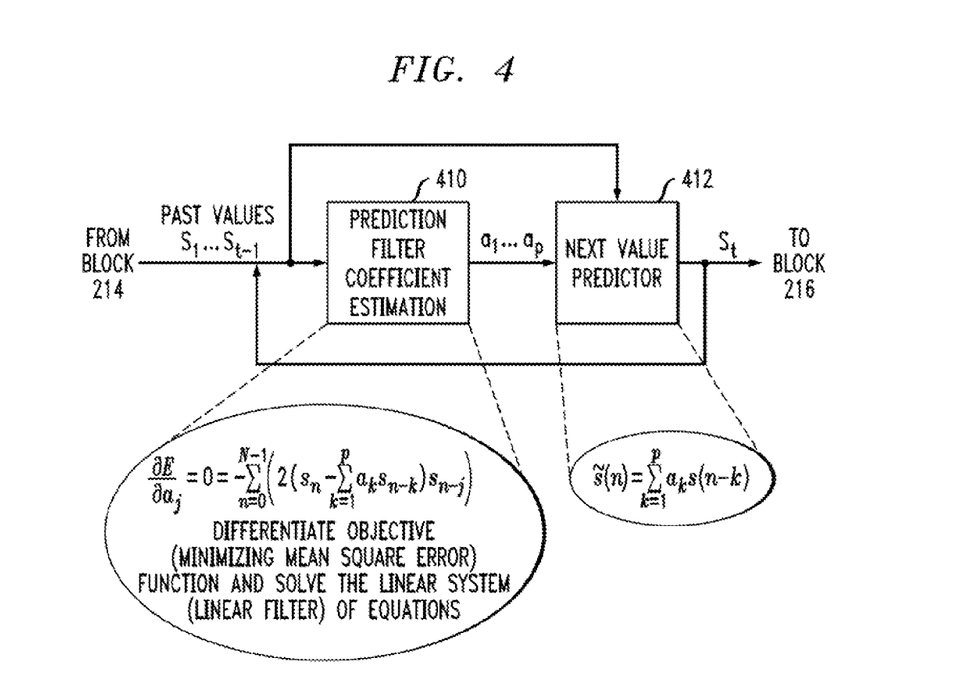
FIG. 4 depicts exemplary usage of a linear filter and mean square error (MSE) as an objective function according to one specific aspect of the invention.

With reference now to FIG. 4, one particular implementation uses mean square error (MSE) as the objective function and a linear prediction filter as the selected model type throughout the prediction process. Blocks 410 and 412 represent particular exemplary implementations of blocks 210 and 212 in FIG. 2. There are a number of reasons for minimizing mean squared error:

1. Mathematically speaking, when minimizing the target function, we will obtain a linear system of equations. We just find the point at which all the partial derivatives of the error are zero, resulting in an easily solvable system of linear equations.
2. MSE favors many small errors over a few big errors that add up to the same value linearly, which is typically desirable, as it prevents sudden overshooting or undershooting.
3. Mean squared error is the error "variance," which grows monotonically with standard deviation, so minimizing squared error also minimizes these commonly used statistical measures.

It is of interest to note that the total squared error over N points is the same as the Euclidean distance in N dimensions, which makes MSE an intuitively attractive metric.

A signal sample s(n) at time n can be approximated by a linear combination of its own past p samples; block 412 in FIG. 4 implements the following formula:

$$\tilde{s}(n) = \sum_{k=1}^{p} a_k s(n-k) \tag{Eq 1}$$

where the coefficients $a_k$ are assumed to be constant over the duration of the analysis window. Linear predictive coding (LPC) determines the coefficients of a forward linear predictor by minimizing the prediction error in the least squares sense. It has applications in filter design and speech coding. LPC finds the coefficients of a $p^{th}$ order linear predictor (FIR filter) that predicts the current value of the real-valued time series s(n) based on past samples.

Given N samples of a data sequence, we would like to compute estimates to $a_i$ that result in the best fit. One reasonable way to define "best fit" is in terms of mean squared error. These parameters $a_i$ can also be regarded as "most probable" parameters if it is assumed that the distribution of errors is Gaussian and a priori there were no restrictions on the values of $a_i$.

The error at any time, $e_n$, is:

$$e_n = s_n - \tilde{s}_n \tag{Eq. 2}$$

$$e_n = s_n - \sum_{i=1}^{p} a_i s_{n-i} \tag{Eq 3}$$

Hence the summed squared error, E, over a finite window of length N is:

$$E = \sum_{n=0}^{N-1} e_n^2 \tag{Eq 4}$$

$$E = \sum_{n=0}^{N-1} \left( s_n - \sum_{k=1}^{p} a_k s_{n-k} \right)^2 \tag{Eq 5}$$

Figure 5:
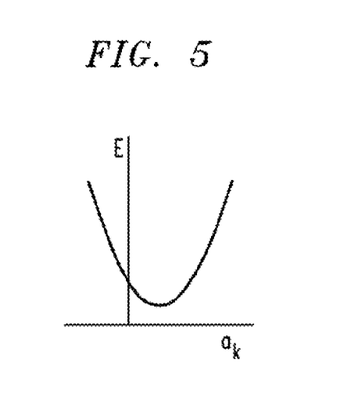
FIG. 5 shows an example of a quadratic error function applicable to one or mole inventive aspects.

The minimum of E occurs when the derivative is zero with respect to each of the parameters, $a_i$. As can be seen from the equation, the value of E is quadratic in each of the parameters; therefore there is a single solution. Very large positive or negative values of E must lead to poor prediction and hence the solution to:

$$\frac{\partial E}{\partial a_j} = 0 \tag{Eq 6}$$

must be a minimum. FIG. 5 shows that the quadratic error function $E(a_k)$ is convex and has a single minimum.

Thus, differentiating the equation (5) for E with respect to $a_i$ and setting equal to zero gives the set of p equations employed in block 410 of FIG. 4:

$$\frac{\partial E}{\partial a_j} = 0 \tag{Eq 7}$$

$$= -\sum_{n=0}^{N-1} \left( 2 \left( s_n - \sum_{k=1}^{p} a_k s_{n-k} \right) s_{n-j} \right)$$

$$= -\sum_{n=0}^{N-1} s_n s_{n-j} + 2 \sum_{n=0}^{N-1} \sum_{k=1}^{p} a_k s_{n-k} s_{n-j}$$

Rearranging Equation 7 gives:

$$\sum_{n=0}^{N-1} s_n s_{n-j} = \sum_{k=1}^{p} a_k \sum_{n=0}^{N-1} s_{n-k} s_{n-j} \quad \text{(Eq 8)}$$

We define the covariance matrix, $\Phi$ with elements $\phi_{i,k}$:

$$\phi_{i,k} = -\sum_{n=0}^{N-1} s_{n-i} s_{n-k} \quad \text{(Eq 9)}$$

Now we can write Equation 8 as:

$$\phi_{i,0} = -\sum_{k=0}^{p} \phi_{i,k} a_k$$

or in matrix form:

$$\Phi = \Phi a \quad \text{(Eq. 10)}$$

Hence the Covariance method solution is obtained by matrix inverse:

$$a = \Phi^{-1} \Phi_0 \quad \text{(Eq. 11)}$$

Note that $\Phi$ is symmetric, that is, $\phi_{i,k} = \phi_{k,i}$, and that this symmetry can be exploited in inverting $\phi$. The values $a_1$ through $a_p$ are determined in block 410 and sent to block 412.

These equations reference the samples: $S_{-p} \ldots S_{-1}$

This technique subsumes a commonly used, simple, yet effective method of "last value prediction"; that is to say, the next value will be the same as the current value. When p=1, the example embodiment described predicts the next value as the current value.

Figure 6:
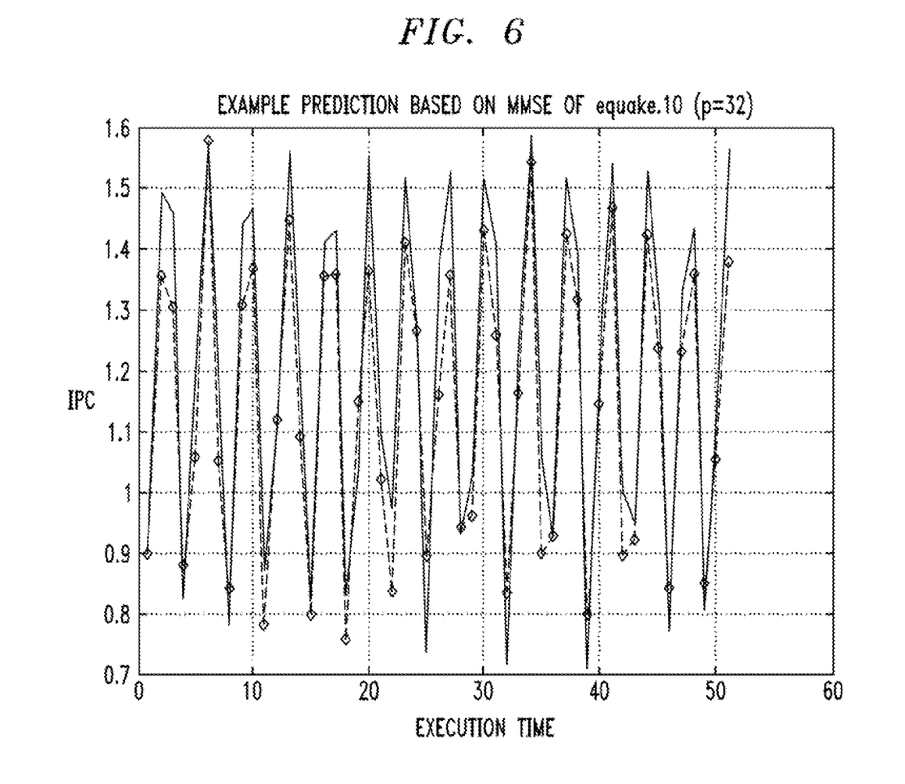
FIG. 6 shows predicted values vs. observed metric values (truth), for one specific non-limiting example.
Figure 7:
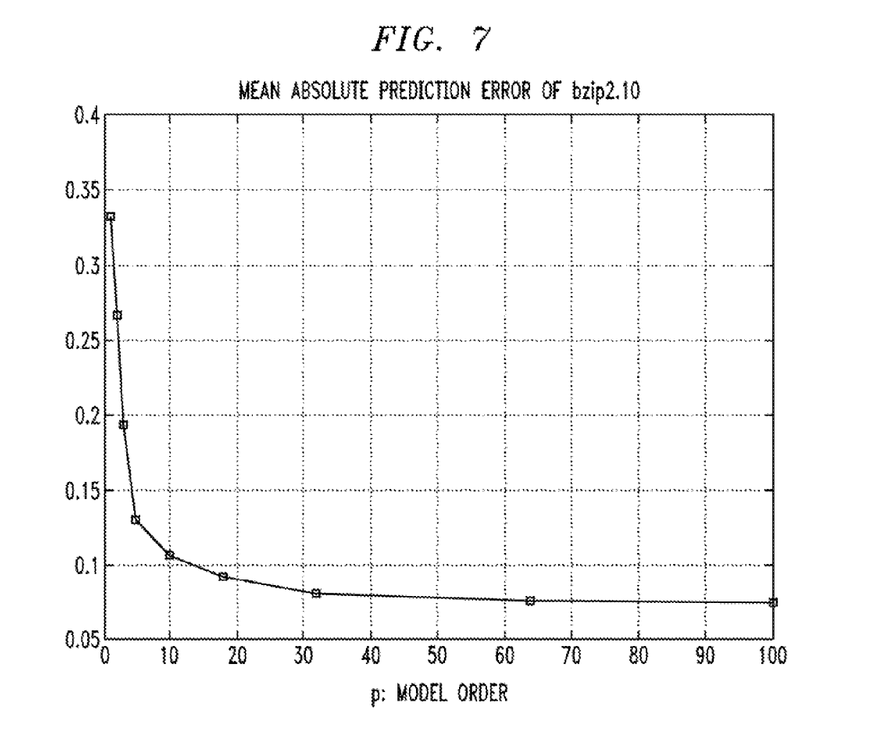
FIG. 7 shows mean absolute prediction error vs. the model older, for one specific non-limiting example.

A specific quantitative example will now be presented to further illustrate one particular application of inventive techniques. Such techniques were applied to performance data that was gathered from a computer system running a workload. FIG. 6 shows an example of predicted values (dashed curve) vs. the truth (measured values-solid curve). The average error is reduced about a factor of 4 5 (0.34→0.075) over the last value prediction, as shown in FIG. 7, which plots mean absolute prediction error versus model order. The exemplary inventive technique tracks the data very well.

One or more embodiments of the invention thus effectively employ statistics as well as signal processing. In one or more embodiments, an "optimal" prediction problem is that of minimizing (or maximizing) an objective function. The objective function uses past data samples as well as extra information available about the metric of interest. One or more embodiments predict the behavior of such computer metrics as power, performance, temperature, reliability, and the like, and accordingly adapt the power-vs-performance tradeoff of a computer system to minimize power usage, or maximize performance, or minimize power usage while not sacrificing from the performance, or to increase reliability, and so on. Signal processing techniques can be applied, with the teachings of the present invention, to metric techniques for microprocessors.

A variety of techniques, utilizing dedicated hardware, general purpose processors, firmware, software, or a combination of the foregoing may be employed to implement the present invention. One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

Figure 8:
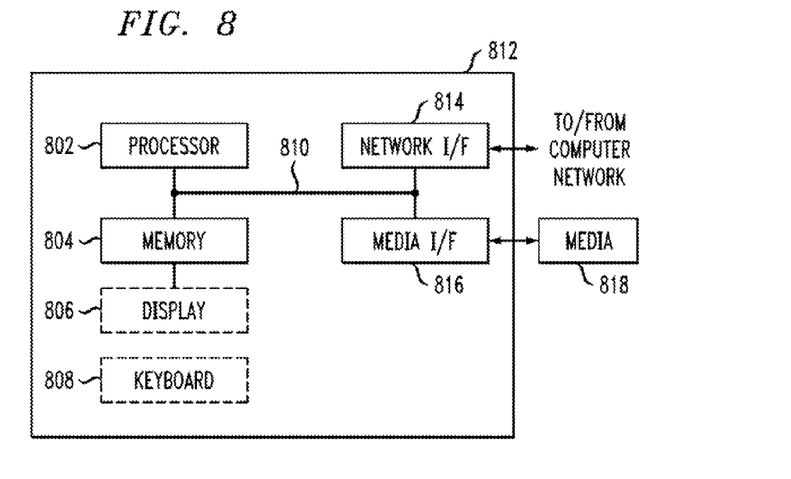
FIG. 8 depicts a computer system that may be useful in implementing one or more aspects and/or elements of the present invention.

At present, it is believed that one or more embodiments will make substantial use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (e.g., hard drive), a removable memory device (e.g., diskette), a flash memory and the like. In addition, the phrase "input/output interface" as used herein, is intended to include, for example, one or more mechanisms for inputting data to the processing unit (e.g., mouse), and one or more mechanisms for providing results associated with the processing unit (e.g., printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. Such software could include, but is not limited to, firmware, resident software, microcode, and the like.

Furthermore, the invention can take the form of a computer program product accessible from a computer-usable or computer-readable medium (e.g., media 818) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (e.g. memory 804), magnetic tape, a removable computer diskette (e.g. media 818), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 802 coupled directly or indirectly to memory elements 804 through a system bus 810. The memory elements can include local memory employed during actual execution of the program code, bulk storage, and cache memories which provide temporary storage of at least some program code in older to reduce the number of times code must be retrieved from bulk storage during execution.

Input/output or I/O devices (including but not limited to keyboards 808, displays 806, pointing devices, and the like) can be coupled to the system either directly (such as via bus 810) of through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, e.g., application specific integrated circuit(s) (ASICS), functional circuitry, one or mole appropriately programmed general purpose digital computers with associated memory, and the like. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of predicting a hardware and/or software metric associated with a computer system, said method comprising the steps of:
providing a system, wherein the system comprises distinct software modules, each of the distinct software modules being embodied on a tangible computer-readable recordable storage medium, and wherein the distinct software modules comprise a selecting module, a processing module, a predicting module, and a data input module;
dynamically choosing an objective function from a pool of available objective functions, by executing said selecting module on at least one hardware processor;
dynamically choosing a prediction model from a pool of available prediction models, by executing said selecting module on said at least one hardware processor;
locating points of inflection for said objective function chosen in said step of choosing said objective function, based on past values of said metric, to obtain a set of equations that can be solved to obtain model parameters associated with said prediction model chosen in said step of choosing said prediction model, said locating being carried out by executing said processing module on said at least one hardware processor;
solving said equations to obtain said model parameters, by executing said processing module on said at least one hardware processor;
predicting a future value of said metric, based on (i) at least some of said past values of said metric and (ii) said prediction model chosen in said step of choosing said prediction model, with said associated model parameters determined in said solving step, by executing said predicting module on said at least one hardware processor;
obtaining a true future value of said metric by executing said data input module on said at least one hardware processor; and
repeating, for a next time step, said steps of choosing said objective function, said choosing said prediction model, and said locating said points of inflection for said objective function, with said true future value of said metric included in said past values of said metric;
wherein said dynamic choosing of said objective function comprises the sub-steps of:
evaluating performance of each objective function in said pool of objective functions based on past values of said metric for a given one of said models, by executing said selecting module on said at least one hardware processor; and
if any of said objective functions in said pool outperforms a current one of said functions in said evaluating step, updating said chosen objective function to said function which outperforms said current function, by executing said selecting module on said at least one hardware processor.

2. The method of claim 1, wherein said steps are conducted for a first sampling rate for measuring said metric, further comprising the additional steps of:
repeating said obtaining and repeating steps of claim 1 for at least one additional sampling rate; and
combining results from said first sampling rate and said additional sampling rate to generate a final predicted value of said metric.

3. The method of claim 2, wherein said combining of said results comprises a weighted combination.

4. The method of claim 2, wherein one of said first sampling rate and said additional sampling rate is a lower resolution rate and another of said first sampling rate and said additional sampling rate is a higher resolution rate, and wherein said combining of said results comprises using results associated with said lower resolution rate to bound results associated with said higher resolution rate.

5. The method of claim 1, wherein said locating said points of inflection for said objective function comprises setting a partial derivative of said objective function with respect to said model parameters equal to zero.

6. The method of claim 1, wherein said dynamic choosing of said prediction model comprises the sub-steps of:
evaluating performance of each prediction model in said pool of prediction models for a given one of said objective functions; and
if any of said prediction models in said pool outperforms a current one of said models in said evaluating step, updating said chosen prediction model to said model which outperforms said current model.

7. The method of claim 1, wherein said objective function comprises one of minimum square error (MSE), minimum error, entropy, likelihood, minimum divergence, maximum margin, minimum classification error, minimum distortion, and minimum variance.

8. The method of claim 1, wherein said prediction model comprises linear prediction (LPC) and said model parameters comprise linear predictive filter coefficients.

9. The method of claim 1, wherein said prediction model comprises one of a non-linear model, a Markov model, a decision tree, and an auto-regressive model.

10. The method of claim 1, further comprising the additional step of taking an appropriate action based on said predicted future value of said metric.

11. The method of claim 10, wherein said action comprises modifying at least one of configuration and operation of said computer system.

12. The method of claim 11, wherein said modifying comprises reallocating system resources associated with said computer system.

13. The method of claim 1, wherein said metric is indicative of at least one of workload, temperature, power, reliability and performance.

14. The method of claim 1, wherein said locating points of inflection for said objective function comprises minimizing said objective function.

15. The method of claim 1, wherein said locating points of inflection for said objective function comprises maximizing said objective function.

16. An apparatus for predicting a hardware and/or software metric associated with a computer system, said apparatus comprising:
  a memory; and
  at least one processor, coupled to the memory, operative to:
    dynamically choose an objective function from a pool of available objective functions;
    dynamically choose a prediction model from a pool of available prediction models;
    locate points of inflection for said chosen objective function, based on past values of said metric, to obtain a set of equations that can be solved to obtain model parameters associated with said chosen prediction model;
    solve said equations to obtain said model parameters;
    predict a future value of said metric, based on (i) at least some of said past values of said metric and (ii) said chosen prediction model, with said associated model parameters;
    obtain a true future value of said metric; and
    repeat, for a next time step, said choosing said objective function, said choosing said prediction model, and said locating said points of inflection for said objective function, with said true future value of said metric included in said past values of said metric;
  wherein said processor is operative to choose said objective function by:
    evaluating performance of each objective function in said pool of objective functions based on past values of said metric for a given one of said models; and
    if any of said objective functions in said pool outperforms a current one of said functions in said evaluating step, updating said chosen objective function to said function which outperforms said current function.

17. A computer program product comprising a tangible computer readable recordable storage medium including computer useable program code for predicting a hardware and/or software metric associated with a computer system, said computer program product including:
  computer useable program code for dynamically choosing an objective function from a pool of available objective functions;
  computer useable program code for dynamically choosing a prediction model from a pool of available prediction models;
  computer useable program code for locating points of inflection for said objective function chosen by said computer useable program code for choosing said objective function, based on past values of said metric, to obtain a set of equations that can be solved to obtain model parameters associated with said prediction model chosen in said step of choosing said prediction model;
  computer useable program code for solving said equations to obtain said model parameters;
  computer useable program code for predicting a future value of said metric, based on (i) at least some of said past values of said metric and (ii) said prediction model chosen by said computer useable program code for choosing said prediction model, with said associated model parameters determined by said computer useable program code for said solving;
  computer useable program code for obtaining a true future value of said metric; and
  computer useable program code for repeating, for a next time step, said choosing said objective function, said choosing said prediction model, and said locating said points of inflection for said objective function, with said true future value of said metric included in said past values of said metric,
  wherein said computer useable program code for dynamically choosing said objective function comprises:
    computer useable program code for evaluating performance of each objective function in said pool of objective functions based on past values of said metric for a given one of said models; and
    computer useable program code for, if any of said objective functions in said pool outperforms a current one of said functions in said evaluating, updating said chosen objective function to said function which outperforms said current function.

* * * * *